United States Patent [19]

Miyagi et al.

[11] Patent Number: 4,681,713
[45] Date of Patent: Jul. 21, 1987

[54] METHOD OF MAKING A HOLLOW FIBER MEMBRANE FOR DIALYSIS

[75] Inventors: Morio Miyagi; Makoto Ohno, both of Otsu; Masaru Kanaizumi, Shiga, all of Japan

[73] Assignee: Toyo Boseki Kabushiki Kaisha, Japan

[21] Appl. No.: 798,491

[22] Filed: Nov. 15, 1985

Related U.S. Application Data

[62] Division of Ser. No. 596,974, Apr. 5, 1984, Pat. No. 4,587,168.

[30] Foreign Application Priority Data

Mar. 15, 1984 [JP] Japan .................................. 59-50362

[51] Int. Cl.$^4$ .............................................. B29C 27/60
[52] U.S. Cl. ........................................ 264/41; 264/48; 264/187; 264/200; 264/203; 264/207; 264/235; 264/346; 210/500.23; 210/500.30; 210/500.31; 210/500.32
[58] Field of Search ...................... 264/45.9, 187, 200, 264/207, 203, 41, 234, 345, 235, 346, 48; 210/500.23, 500.30, 500.31, 500.32

[56] References Cited

U.S. PATENT DOCUMENTS

| 4,322,381 | 3/1982 | Joh ..................................... | 264/187 |
| 4,323,627 | 4/1982 | Joh ..................................... | 264/187 |
| 4,342,711 | 8/1982 | Joh et al. .............................. | 264/41 |

FOREIGN PATENT DOCUMENTS

| 56-20609 | 2/1981 | Japan .................................. | 264/187 |
| 56-26004 | 3/1981 | Japan .................................. | 264/187 |
| 1116171 | 6/1968 | United Kingdom ................ | 264/345 |

OTHER PUBLICATIONS

"Drying Cellulose Acetate Reverse Osmosis Membranes"; Vos and Burns, Jr.; I&EC Prod. Res. & Dev., vol. 8, No. 1, 3/69, 84–89.

*Primary Examiner*—Jan H. Silbaugh
*Assistant Examiner*—Hubert C. Lorin
*Attorney, Agent, or Firm*—Jones, Tullar & Cooper

[57] ABSTRACT

A hollow fiber membrane of a cellulose ester for dialysis of body liquids, such as blood, and a method are described. The membrane, which has a membrane thickness of less than 20μ, and a yield strength $S_b$ (g/filament) after heat-treatment at 80° C. for 20 hours satisfies the following formula (I):

$$0.90 \leqq S_b/S_a \leqq 1.10 \qquad (I)$$

wherein $S_a$ represents the yield strength (g/filament) of the hollow fiber membrane which is measured before heat treatment. The membrane has excellent dialysis performance while keeping excellent storage stability and excellent UFR retention during storage and during hemodialysis. A spinning solution of a cellulose ester is extruded through cyclic slits around an inner tube of a spinneret while a core solution is simultaneously extruded through the inner tube of the spinneret. The extruded spinning solution is passed through a gaseous atmosphere, entered into an aqueous coagulation bath, passed through a glycerin bath, dried, reeled onto a bobbin in the form of fibers and heat-treated on the bobbin.

2 Claims, No Drawings

METHOD OF MAKING A HOLLOW FIBER MEMBRANE FOR DIALYSIS

This is a divisional of co-pending application Ser. No. 596,974, filed on Apr. 5, 1984, now U.S. Pat. No. 4,587,168.

The present invention relates to a novel hollow fiber membrane. More particularly, it relates to a hollow fiber membrane made of a cellulose ester which is suitable for an artificial kidney.

It is known that cellulose esters are processed to form hollow fiber membranes which are used for various processes, for example, separation processes with saving energy, such as a process for de-salting from sea water or salt water, and ultrafiltration of aqueous solutions containing various solutes.

It is known that cellulose esters are suitable for preparing hollow fiber membranes useful for an artificial kidney because they have good biocompatibility and further are easily produced, and hence, extensive studies have been done thereon. Generally, in order to use the cellulose ester hollow fiber membrae for an artificial kidney, the material of the hollow fiber should satisfy the following six conditions:

(1) It should have excellent dialysis performance, i.e. it should have a suitable ultrafiltration rate (hereinafter, referred to as "UFR") and also excellent permeability of solutes such as urea, creating, etc.

(2) The hollow fiber membrane made therefrom should not show blood leakage.

(3) It should have good compatibility with blood, i.e. it should induce less thrombogenicity and less hemolysis.

(4) After the hemodialysis, no blood should remain in the module (i.e. a unit of hollow fiber membrane assembly of separation apparatus).

(5) Less amount of material is dissolved out from the hollow fiber membrane.

(6) During storage or during the hemodialysis, no change of the dialysis performance, particularly UFR, should be observed.

There has never been known a hollow fiber membrane which satisfies all of the above conditions. It is known that when the membrane thickness of the hollow fiber membrane is made thinner, the product shows better permeability of solutes such as urea, uric acid, creatinine, etc. and higher dialysis efficiency, and thereby, the module for dialysis can be made in a smaller scale and the amount of blood to be circulated outside the patient's body is advantageously made smaller. However, when the membrane thickness is made thinner, the hollow fiber membrane shows disadvantageous lowering of maintenance of the dialysis performance, i.e. the sixth requirements among the above-mentioned six conditions: change of the dialysis performance particularly lowering of UFR, during storage or during the hemodialysis. The conventional hollow fiber membrane made of cellulose ester should have a thickness of not less than about 20$\mu$ in order to prevent the disadvantageous lowering of maintenance of the performance, but such a membrane has still some problems in the dialysis performance, that is, it is difficult to give improved UFR and a high peameability of urea.

The present inventors have conducted intensive studies aimed at producing an improved hollow fiber membrane having no change of dialysis performance during storage or during the hemodialysis while maintaining the advantages of a thin membrane. As a result, it has been found that the desired properties can be achieved by a hollow fiber membrane of a cellulose ester which has a membrane thickness of less than 20$\mu$, and a yield strength $S_b$ (g/filament) after heat-treated at 80° C. for 20 hours satisfying the following formula (I):

$$0.90 \leq S_b/S_a \leq 1.10 \tag{I}$$

wherein $S_a$ refers to yield strength (g/filament) of the hollow fiber membrane for dialysis which is measured before heat treatment.

The cellulose ester used for the preparation of the cellulose ester hollow fiber membrane for dialysis of the present invention includes cellulose esters, such as cellulose diacetate, cellulose triacetate, cellulose propionate, cellulose butyrate, cellulose acetate propionate or the like, which may be used alone or in combination of two or more thereof.

The hollow fiber membrane of the present invention should essentially satisfy the condition that it has a membrane thickness of less than 20$\mu$, and the condition of the above formula (I). Although it is known that when the membrane has a thinner thickness, it shows better permeability of solutes such as urea or creatinine, there is usually used a hollow fiber membrane having a membrane thickness of about 20$\mu$ or more in view of storage stability and also stability in a dialysis procedure. The hollow fiber membrane of the present invention can be made thin with a holding fast membrane structure. When the ratio of $S_b/S_a$ is less than 0.9, the hollow fiber membrane shows undesirable lowering of the yield strength during storage for a long period of time, and hence, when it is used for the hemodialysis, it is unstable in strength. As a result, blood leakage may be induced which is a fatal drawback for artificial kidneys. On the other hand, when the ratio of $S_b/S_a$ is over 1.1, the hollow fiber membrane tends to become dense in structure when exposed to high temperature during storage or transportation, and hence, the dialysis performance is decreased and the original hemodialysis capacity can not be exhibited, which produces severe bad effects for the patients. The yield strength of the hollow fiber membrane is measured by a universal tensile tester, that is, by subjecting the membrane to the tester at a fixed length of the hollow fiber of 50 mm and a tensile rate of 10 mm/minute to obtain a stress-strain curve, followed by calculating the yield strength from the yield point gotten from the curve.

Thus, the hollow fiber membrane of the present invention is characterized in that owing to the desired membrane thickness and the dynamic properties, the dialysis performance, particularly UFR, is not lowered during storage or transportation, or during the hemodialysis. For example, the hollow fiber membrane of the present invention shows the following UFR retention in storge test and in bovine blood filtration test. That is, the module for dialysis prepared from the hollow fiber membrane of the present invention is kept at 55° C. for 15 days, and then the storage UFR retention (%) is calculated by the following formula:

$$\text{Storage } UFR \text{ retention (\%)} = \frac{UFR \text{ value after storage}}{UFR \text{ value before storage}} \times 100$$

The hollow fiber membrane of the present invention shows a storage UFR retention of more than 90%.

Besides, a module for dialysis prepared from the hollow fiber membrane of the present invention is subjected to a filtration test of a bovine blood wherein the hematocrit value is controlled to 40% under a transmembrane pressure of about 300 mmHg, and the change of UFR is measured with lapse of time. The UFR retention (%) in the bovine blood filtration test is calculated by the following formula:

*UFR* retention in bovine blood filtration test (%) =

$$\frac{\text{UFR value 120 minutes after initiation of filtration test}}{\text{UFR value 15 minutes after initiation of filtration test}} \times 100$$

The hollow fiber membrane of the present invention shows a UFR retention in a bovine blood filtration test of more than 90%.

The hollow fiber membrane of the present invention has a membrane thickness of not less than $5\mu$, because according to the present practical technique, it can not be spun to obtain a round, uniform hollow fiber membrane having a thickness of less than $5\mu$. The cellulose ester hollow fiber membrane of the present invention has a inner diameter of $100\mu$ to $400\mu$, preferably $150\mu$ to $300\mu$. In order to increase the efficiency of dialysis of solutes by making the membrane thickness thin while preventing undesirable biased flow within the module, it is preferable to provide appropriate crimps on the hollow fiber membrane. The crimps are particularly preferably provided in a crimp number of 10 to 35 per 10 cm length of the hollow fiber membrane and a crimp amplitude L (unit: micron) (which expresses the size of crimp) in the range of from 65% of the outer diameter of the hollow fiber membrane to the outer diameter of the hollow fiber membrane plus $50\mu$. When the crimp amplitude is within the above range, the hollow fiber membrane can be assembled to a module having improved dialysis performance while preventing undesirable biased dialysate flow, and further, the module can be made compact as well as making the membrane thickness sufficiently thin.

The cellulose ester hollow fiber membrane of the present invention can be prepared in the following manner.

A spinning solution of a cellulose ester is extruded through cyclic slits around the inner tube of a spinneret having a double structure while extruding simultaneously a core solution through the inner tube of the spinneret, passing the spinning solution extruded from the cyclic slit through a gaseous atmosphere, introducing the same into an aqueous coagulation bath, washing the coagualted hollow fibers with hot water, passing them through a glycerin bath, drying with hot air, reeling up onto a bobbin, and then heat-treating the reeled hollow fibers.

In order to obtain the desired hollow fiber membrane, the spinning should be done under the following conditions, all of which should be satisfied simultaneously.

The spinning solution has a concentration of cellulose ester of 27 to 37% by weight; the coagulation bath has a water content of 65 to 90% by weight, preferably 70 to 85% by weight; the washing with hot water is done with water having a temperature of 40° to 80° C.; the glycerin bath has a glycerin concentration of 25 to 60% by weight and has a temperature of the glycerin solution of 35° to 80° C.; and the heat treatment of the reeled fibers is carried out under a humidity of 10 to 20 g-$H_2O$/kg-dry air and at a dry-bulb temperature of 60° to 100° C.

When the above conditions are satisfied, the desired hollow fiber membrane can be produced, but when the hollow fiber membrane having a thinner thickness is used for a dialysis, e.g. for a dialysis of blood, the subtances remain in the hollow fiber membrane tend to easily move toward the patient. Accordingly, it is preferable to reduce the amount of the substance remained in the thin hollow fiber membrane to as little as possible. For such a purpose, it is preferable to control the starting materials (i.e. checking of the impurities in the starting materials) and also to enforce the washing with hot water. Particularly, as to the starting cellulose ester which is a solid material and is hardly controlled with regard to the impurities, it is preferable to previously extract it with fifteen times in volume of a mixed solvent of acetone and water (55:45 by volume) at 20° C. for 1 hour. A cellulose ester having an extraction ratio of less than 0.5% by weight is particularly preferred.

The hollow fiber membrane thus obtained has a membrane thickness of less than $20\mu$ and a yield strength $S_b$ after heat treatment of the formula (I) as mentioned hereinbefore and shows a suitable UFR as well as good maintenance of the dialysis performance during storage and during the dialysis procedure without undesirable troubles such as blood leakage, thrombogenicity, hemolysis and remaining of blood. Thus, the hollow fiber membrane of the present invention is useful for dialysis for body liquids, particularly for dialysis of blood.

The present invention is illustrated by the following Examples, but should not be construed to be limited thereto.

EXAMPLE 1

Cellulose diacetate (extraction rate with acetone/water = 55/45 by volume: 0.32% by weight, 33 parts by weight), N-methyl-2-pyrrolidone (54 parts by weight) and ethylene glycol (13 parts by weight) are mixed and dissolved to give a spinning solution. The spinning solution is spun with a spinning machine with a cyclic orifice nozzle, wherein the spinning solution is supplied from the outer tube and a liquid paraffin is extruded as a core solution from the inner tube. The hollow spinning solution extruded from the cyclic orifice is run within air in a length of 5 cm and then introduced into a coagulation bath containing 75 parts by weight of water to coagulate the solution. The coagulated hollow fibers are washed well with hot water at 50° C., passed through an aqueus solution of glycerin having a concentration of glycerin of 45% by weight at 40° C., passed through a drying zone wherein a drying air of 60° C. is counter-flowed, and then reeled up onto a bobbin with a winder. The hollow fibers reeled on the bobbin are heat-treated within a sealed room under a humidity of 14 g-$H_2O$/kg-dry air at a temperature of 70° C. for 15 hours.

The cellulose diacetate hollow fibers thus obtained are round and have an inner diameter of $200\mu$, a membrane thickness of $15\mu$, a crimp number of 17 crimps/10 cm, and a crimp amplitude of $180\mu$.

A module for dialysis (1.1 m²) was assembled with the hollow fiber membrane. The module for dialysis had a UFR of 5.9 ml/hr.mmHg when measured based on the dialyzer performance evaluation standard provided by Nippon Artificial Organs Association. when this module for dialysis was applied to dialysis of blood in flow rate of blood of 200 ml/minute, the clearance of urea was 174 ml/minute.

The yield strength of the hollow fiber membrane for dialysis was measured before and after the heat treatment at 80° C. for 20 hours, and therefrom, the retention ratio ($S_b/S_a$) was calculated. As a result, the retention ratio was 1.03. Besides, when the module for dialysis was kept at 55° C. for 15 days (the 55° C. being the highest temperature which might be exposed during transportation), the retention of UFR was an excellent 93%. In the bovine blood filtration test, the module for dialysis also showed an excellent retention of UFR of 95%.

Reference Example 1

In the same manner as described in Example 1 except that the extrusion amount of the starting spinning solution and the spinning rate was changed, there are produced a hollow fiber membrane having an inner diameter of 200μ, a membrane thickness of 27μ.

A module for dialysis (1.1 m²) was assembled with the hollow fiber membrane. This module for dialysis showed a yield strength retention ratio ($S_b/S_a$) (before and after the heat treatment at 80° C. for 20 hours) of 1.01. However, when the dialysis performance of the module for dialysis was tested in the same manner as described in Example 1, it showed a UFR of 3.5 ml/hr.mmHg and a clearance of urea of 140, which are insufficient for dialysis.

Reference Example 2

The same opening solution and core solution as used in Example 1 are spun with a cyclic orifice. The hollow spinning solution extruded from the cyclic orifice is run within air in a length of 5 cm and then introduced into a coagulation bath containing 60 parts by weight of water to coagulate the solution. The coagulated hollow fibers are washed well with water at room temperature, passed through an aqueous solution of glycerin having a concentration of glycerin of 45% by weight at 40° C., passed through a drying zone wherein a drying air of 60° C. is counter-flowed, and then reeled up onto a bobbin with a winder.

The cellulose diacetate hollow fibers thus obtained have an inner diameter of 200μ, a membrane thickness of 15μ.

A module for dialysis (1.1 m²) was assembled with the hollow fiber membrane. This module for dialysis showed a yield strength retention ratio ($S_b/S_a$) (before and after the heat treatment at 80° C. for 20 hours) of 1.15. However, when the module for dialysis was kept at 55° C. for 15 days, it showed a UFR retention of 83%, which was insufficient for dialysis. Besides, it also showed insufficient UFR retention in a bovine blood filtration test of 81%.

EXAMPLE 2

In the same manner as described in Example 1 except that the amount of water in the coagulation bath is 80 parts by weight and the concentration of glycerin in the glycerin bath is 50% by weight, there is produced a cellulose diacetate hollow fiber membrane having a membrane thickness of 15μ.

A module for dialysis (1.1 m²) was assembled with the hollow fiber membrane. The UFR of the module for dialysis was measured in the same manner as described in Example 1. As a result, it had a UFR of 6.1 ml/hr.mmHg and a clearance of urea of 176 ml/minute. Besides, the yeild strength of the hollow fiber membrane for dialysis before and after the heat treatment at 80° C. for 20 hours and then the retention ratio ($S_b/S_a$) was calculated. As a result, the ratio was 1.02. Moreover, the UFR retention during storage and that in bovine blood filtration test were tested likewise. As a result, they were 94% and 94%, respectively.

What is claimed is:

1. A method for producing a hollow fiber membrane of a cellulose ester useful for dialysis of body liquids, such as blood, which has a membrane thickness of less than 20μ but not less than 5μ, having a suitable ultra filtration rate retention, and a yield strength $S_b$ (g/filament) after heat-treatment at 80° C. for 20 hours satisfying the following formula (I):

$$0.90 \leq S_b/S_a \leq 1.10 \qquad (I)$$

wherein $S_a$ represents the yield strength (g/filament) of the hollow fiber membrane measured before heat treatment, which comprises the steps of: extruding a spinning solution of a cellulose ester having a concentration of the cellulose ester of 27 to 37% by weight through cyclic slits around an inner tube of a spinneret having a double tube structure, while extruding simultaneously a core solution through the inner tube of the spinneret; passing the spinning solution extruded from the cyclic slits through a gaseous atmosphere; entering the same into an aqueous coagulation bath having a water content of 65 to 90% by weight; washing the coagulated hollow fibers with hot water of 40° to 80°; passing through a glycerin bath having a glycerin concentration of 25 to 60% by weight and a temperature of glycerin of 35° to 80°; drying with hot air of 60° to 80°; reeling up onto a bobbin; and heat-treating the reeled fibers under a humidity of 10 to 20 g-H₂O/kg-dry air and a dry-bulb temperature of 60° to 100°.

2. The method according to claim 1, wherein the starting cellulose ester is washed with a mixed solvent of acetone/water of 55:45 by volume, and wherein the cellulose ester is extracted at a ratio of not higher than 0.5% by weight.

* * * * *